United States Patent [19]

Dougherty et al.

[11] 4,121,017
[45] Oct. 17, 1978

[54] PORTABLE RECHARGEABLE LEAD-ACID BATTERY

[75] Inventors: Thomas John Dougherty, Waukesha; Roy Erving Hennen, Mequon, both of Wis.

[73] Assignee: Globe-Union Inc., Milwaukee, Wis.

[21] Appl. No.: 845,280

[22] Filed: Oct. 25, 1977

[51] Int. Cl.² .................................... H01M 2/30
[52] U.S. Cl. ................................ 429/7; 429/160; 429/177; 429/178
[58] Field of Search ............... 429/82, 54, 7, 160, 429/87, 177, 178, 179

[56] References Cited

U.S. PATENT DOCUMENTS

| | | | |
|---|---|---|---|
| 3,402,077 | 9/1968 | Kida et al. | 429/54 |
| 3,764,394 | 10/1973 | Phillips | 429/178 |
| 3,846,175 | 11/1974 | Desai | 429/160 |
| 3,862,861 | 1/1975 | McClelland | 429/57 |
| 3,977,907 | 8/1976 | Roth et al. | 429/7 |
| 4,029,855 | 6/1977 | Dougherty et al. | 429/160 |

FOREIGN PATENT DOCUMENTS

644,420  10/1950  United Kingdom ............ 429/87

Primary Examiner—Donald L. Walton
Attorney, Agent, or Firm—David B. Smith; John Phillip Ryan

[57] ABSTRACT

A rechargeable portable lead-acid battery for use in providing electrical power to portable devices such as lanterns and the like, the battery particularly including an improved container and cover, an improved battery post construction and an improved electrical assembly.

17 Claims, 19 Drawing Figures

PORTABLE RECHARGEABLE LEAD-ACID BATTERY

BACKGROUND OF THE INVENTION

1. Field of the Invention

The present invention relates to portable batteries of the type which are used as lantern batteries and in other portable electrically powered devices. More particularly, the invention relates to a rechargeable lead-acid battery for use in lanterns and the like and including an improved container and cover, an improved battery post construction and interconnection with the battery plates and an improved electrical assembly.

2. Description of the Prior Art

It is generally desirable that portable batteries of the type used to provide electric power for lanterns or the like produce a substantial amount of electric current yet have a limited weight. It is further desirable that such batteries also be rechargeable many cycles. It is also necessary that the battery have a design and construction which facilitates manufacture of the battery at the lowest possible cost.

Prior art batteries related to the type of the invention are illustrated for purposes of example in U.S. Pat. No. 3,977,907, issued Aug. 31, 1976 to Roth et al; U.S. Pat. No. 3,650,841, issued Mar. 21, 1972 to Brindley; U.S. Pat. No. 3,402,077, issued Sept. 17, 1968 to Katuhiko Kida et al; U.S. Pat. No. 3,233,092, issued Feb. 1, 1966 to Umholtz and U.S. Pat. No. 3,862,861, issued Jan. 28, 1975 to McClelland et al. The batteries shown in the above noted patents have generally failed to provide a sufficiently inexpensive, rechargeable portable battery functional for use in a lantern or the like.

SUMMARY OF THE INVENTION

The present invention provides an improved battery of the type used to power lanterns or the like, the battery being efficient, having an extended cycle life and being less expensive to manufacture than prior art batteries. More specifically, the invention includes a lead-acid battery having an improved container construction as well as an improved means for providing electrical connection of the battery posts to the battery plates. The battery also includes an improved electrical assembly including a thermal circuit breaker to prevent short circuiting of the battery terminals.

DESCRIPTION OF THE PREFERRED EMBODIMENT

Figure 1:
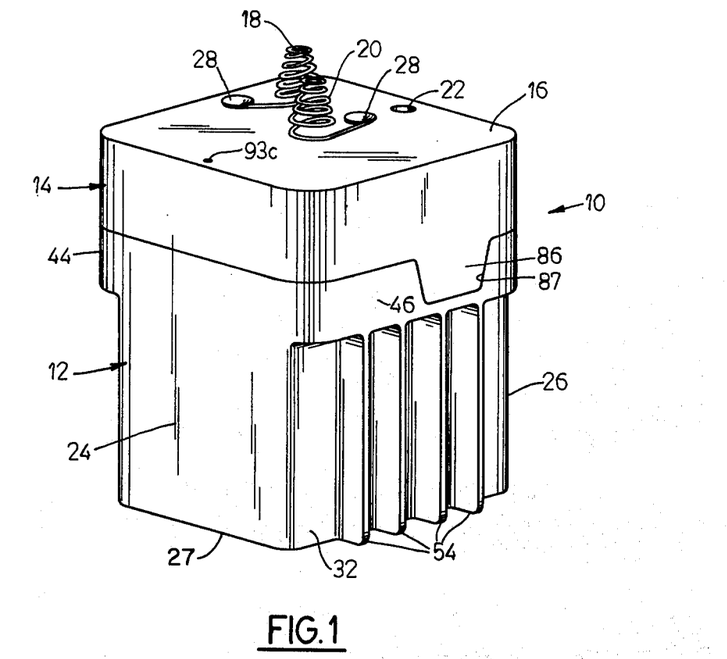
FIG. 1 is a perspective view of a battery of the invention.

A preferred embodiment of the battery 10 of the invention is shown in a perspective view in FIG. 1 and generally includes a container 12 and a battery cover 14 together housing the elements of the battery therein. The top wall 16 of the battery cover supports upwardly projecting positive and negative coil spring battery terminals 18 and 20, respectively. The battery cover 14 also includes a bore 22 therein housing a recharging jack.

Battery Container

Figure 3:
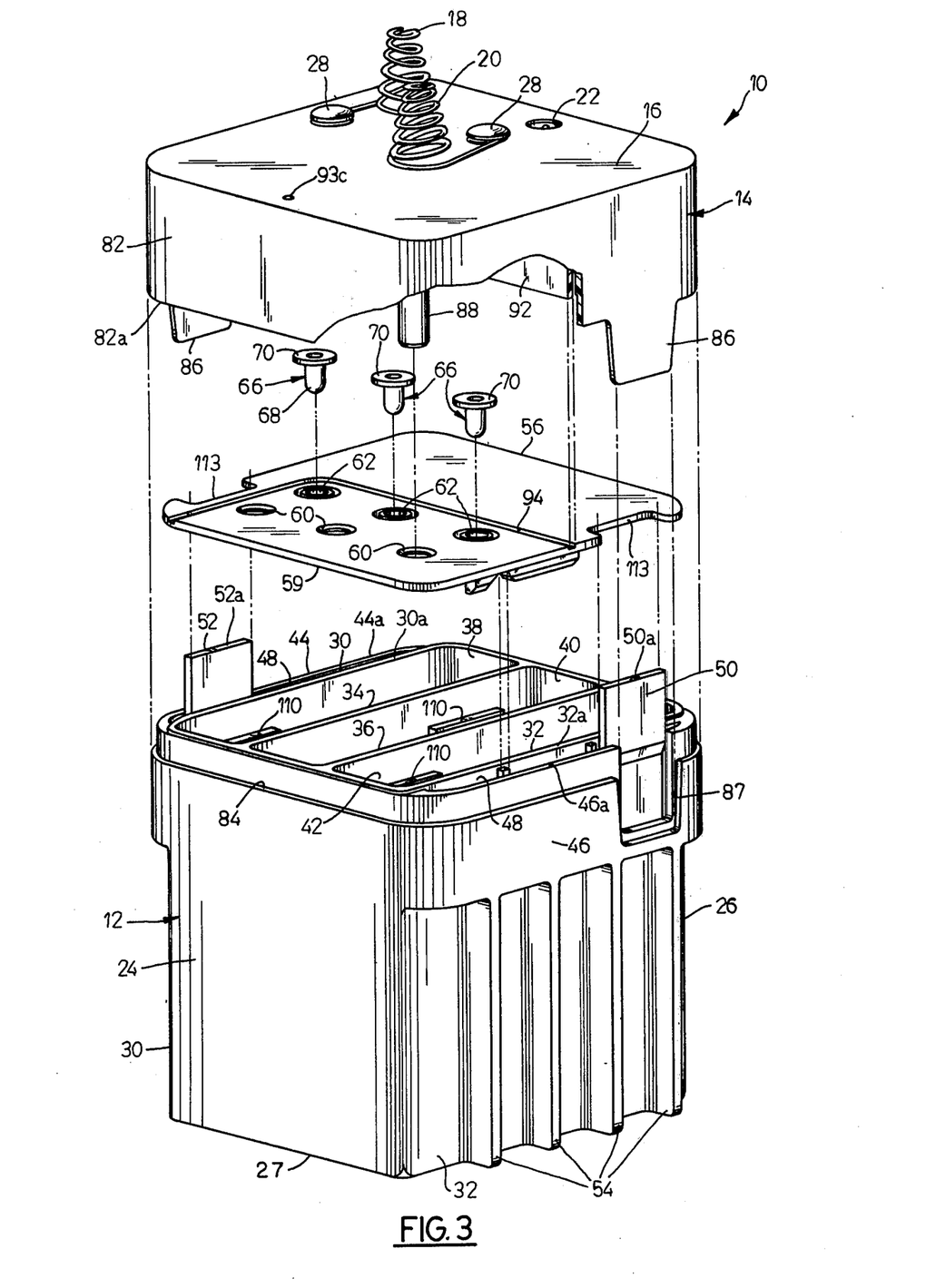
FIG. 3 is an exploded perspective view of the battery of FIG. 1 with portions broken away in the interest of clarity.

The container 12 and battery cover 14 are shown more clearly in exploded relationship in FIG. 3. The battery container 12 includes a pair of side walls 24 and 26, a bottom wall 27 (FIG. 4) and a pair of end walls 30 and 32. The container 12 also includes a pair of spaced apart parallel partition walls 34 and 36 each extending between the side walls 24 and 26 and being parallel to the end walls 30 and 32, the partition walls 34 and 36 defining three cell compartments 38, 40 and 42.

The end walls 30 and 32 support channel walls 44 and 46, respectively, the channel walls being integrally connected to the upper portions of the end walls 30 and 32, and defining narrow channels 48 (FIGS. 5–7) between the outside surfaces of the upper portions of each of the end walls 30 and 32, and the inner surface of the channel walls, the channels 48 intended to house battery terminal posts 50 and 52. The channel walls 44 and 46 each have curved opposite ends, the opposite ends of channel wall 44 integrally joining the edges of the upper portion of the end wall 30 and the opposite ends of channel wall 46 integrally joining the peripheral edges of end wall 32. The channel walls also each include an upper edge 44a and 46a, respectively, spaced from and generally parallel to the upper edge 30a or 32a of the respective adjacent end wall 30 or 32.

The end walls 30 and 32 also support parallel vertical vanes 54 extending outwardly from the end walls below the channel walls 44 and 46, the vertical vanes 54 being integrally joined at their upper ends to one of the channel walls 44 or 46.

Container Cover

Figure 4:
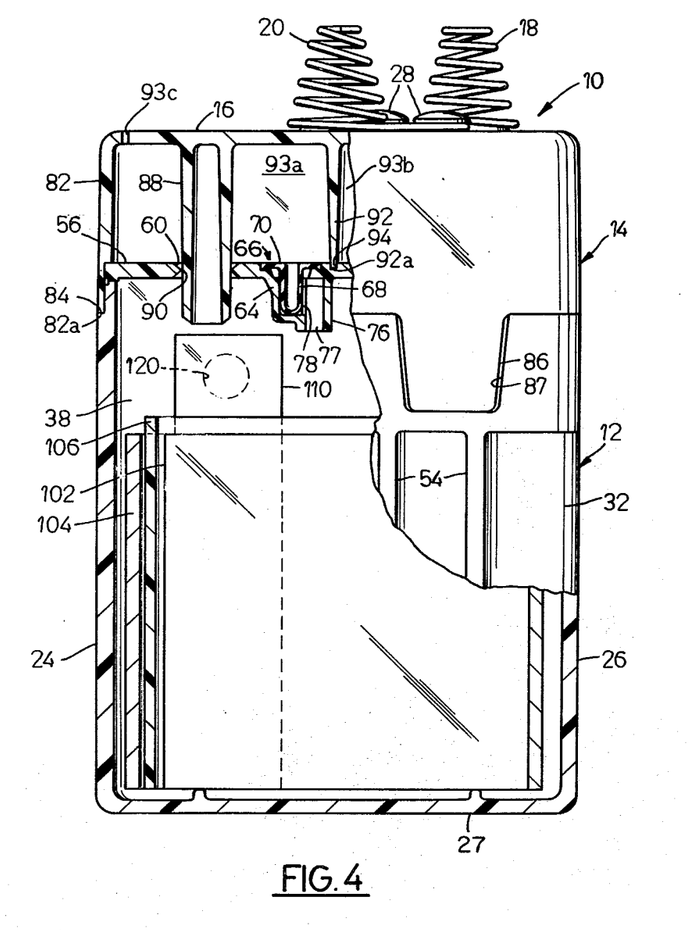
FIG. 4 is a side elevation view of the container and top cover of the battery shown in FIG. 1 with portions broken away in the interest of clarity.
Figure 5:
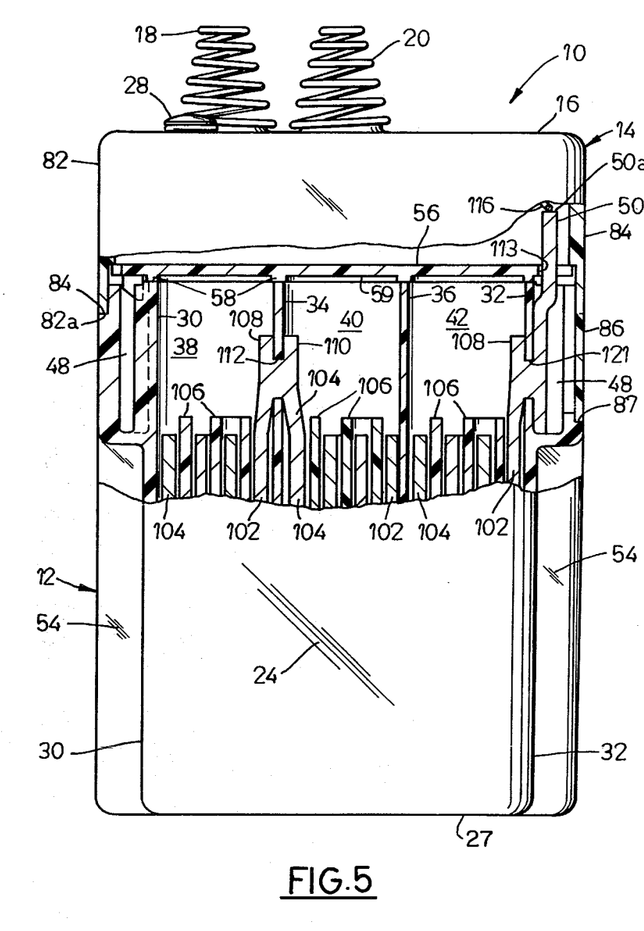
FIG. 5 is a side elevation view of the battery shown in FIG. 1 with portions thereof broken away in the interest of clarity.

The upper edges of the end walls 30 and 32, the side walls 24 and 26 and the partitions 34 and 36 define a horizontal plane for supporting a generally flat or planar container cover 56. The container cover 56 is intended to be sealed to the upper edges of the container walls and partitions by heat sealing, ultrasonic welding, an adhesive, or other like means to thereby form sealed cell compartments 38, 40 and 42 in the container 12 as shown in FIGS. 4 and 5. To provide for such sealing engagement the container cover 56 includes downwardly extending ribs 58 projecting from its lower surface 59, the ribs 58 being located for alignment with the upper edges of the container walls and the partitions.

The container cover 56 is more clearly shown in FIGS. 12–15 and generally includes three aligned apertures 60, to be described more particularly hereinafter, and three vents 62. The vents 62 each include a bore 63 extending through the container cover 56, the bore 63 being aligned with a cylindrical valve housing 64, the valve housing 64 integrally joined to the container cover 56 and extending downwardly from its lower surface. A pressure relief valve 66 (FIG. 3) comprised of a resilient material, is securely held in each valve housing 64 and includes a cylindrical body portion 68 surrounded by an annular flange 70 at its upper end. The cylindrical body portion 68 includes a longitudinal cavity 68a therein (FIG. 4), the cavity being closed at its lower end and open at the end of the cylindrical body supporting the surrounding annular flange 70. The cylindrical body 68 is received in the cylindrical housing 64 of the vent and the annular flange 70 is received within an annular seat 72 surrounding the vent bore and is supported by a shoulder 74 of the annular seat 72. The vents 62 further include a cylinder 76, adjacent and integrally connected to each of the valve housings 64 which extend downwardly from the bottom surface of the container cover 56. The cylinders 76 are each open at their respective lower ends 77 and a vertical slot 78 provides for fluid communication between the cylinder 76 and the cylindrical valve housing 64. If gas pressure develops in one of the cell compartments 38, 40 or 42, the gas can be vented through cylinder 76 and slot 78 into the valve housing 64 and past the flexible annular flange 70 of the pressure relief valve 66.

The portable lead-acid battery of the invention will generally include a liquid electrolyte. Most of the electrolyte will be absorbed in the abosrbent matted glass separators to be described, but some excess electrolyte will be free in the cell compartments. It will be noted that the downwardly extending cylinders 76 function to prevent escape of the excess electrolyte through the vents 62 in the event the battery is inverted in that the openings to the vents 62 are spaced from the bottom surface of container cover 56.

Battery Top Cover

The battery cover 14 is best shown in FIGS. 1, 3 and 4 and includes a generally planar top wall 16 and a downwardly extending peripheral wall or skirt 82. The lower edge 82a of the peripheral wall 82 is intended to surround the upper edges of the container side walls 24 and 26 and the channel walls 44 and 46 and rests against a peripheral ledge 84 surrounding the upper portions of these walls. The peripheral wall 82 includes a pair of downwardly extending tapered flanges 86 respectively receivable within tapered notches 87 formed in the channel walls 44 and 46, the tapered flanges 86 sealing the notches 87. The battery cover 14 also includes three downwardly extending tapered plastic locking mandrels 88 integrally joined to the lower surface of the planar top wall 16, each mandrel 88 intended to be lockingly received in one of the locking apertures 60 in the container cover 56 to thereby provide means to secure the top cover 14 against the container cover 56 and container 10. The locking apertures 60 in the container cover 56 each include a circumferential bevelled inwardly extending locking ridge 90 surrounding the inside of the aperture, best shown in FIGS. 4 and 13. As shown in FIG. 4, the locking mandrels 88 are each slightly tapered in such a manner that their diameter decreases toward their respective free ends such that when the top cover is forced downwardly against the container cover 56, the locking mandrels 88 will be received in the locking apertures 60, with the inwardly extending locking ridges 90 within the apertures 60 engaging the plastic locking mandrels 88 and preventing removal of the top cover 14.

Referring to FIGS. 3, 4 and 8–10, the top cover 14 is also shown as including a curved partition wall 92 therein, the partition wall 92 extending downwardly from the top wall 16 of the top cover 14 and functioning to divide the cavity formed between the top cover 14 and container cover 56 into two chambers or compartments 93a and 93b. The container cover 56 is provided with a complementary curved groove 94 in its upper surface intended to receive the lower edge 92a of the curved partition wall 92 when the top cover 14 is secured in place on the container 10. The chamber 93b houses the electrical components of the battery. The other chamber, chamber 93a, receives gases vented from the battery cells through the vents 62, and this chamber is in turn vented to the ambient atmosphere through a small hole 93c in the top cover 14. It will be appreciated that the partition wall 92 functions to protect the electrical components from corrosion by preventing vented gases from coming in contact with these components.

Cell Construction

Figure 6:
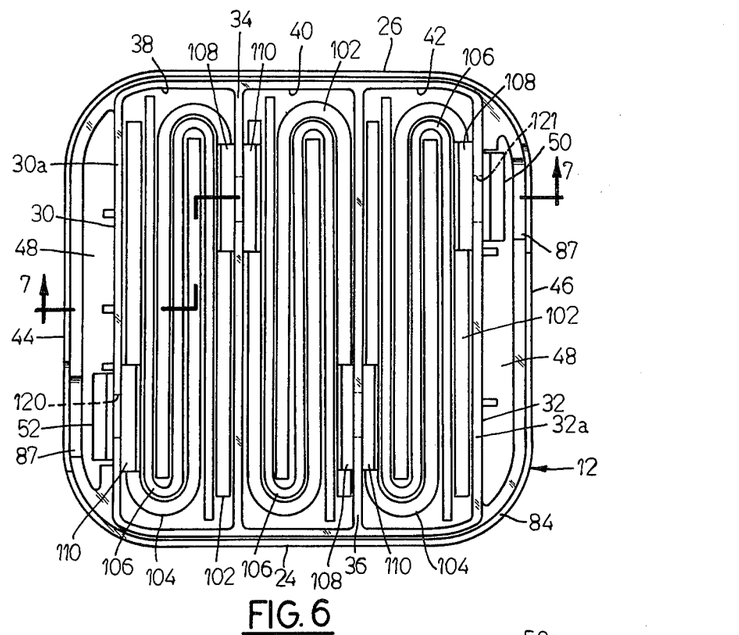
FIG. 6 is a plan view of the container of the battery shown in FIG. 1 and having battery elements disposed within the container.
Figure 7:
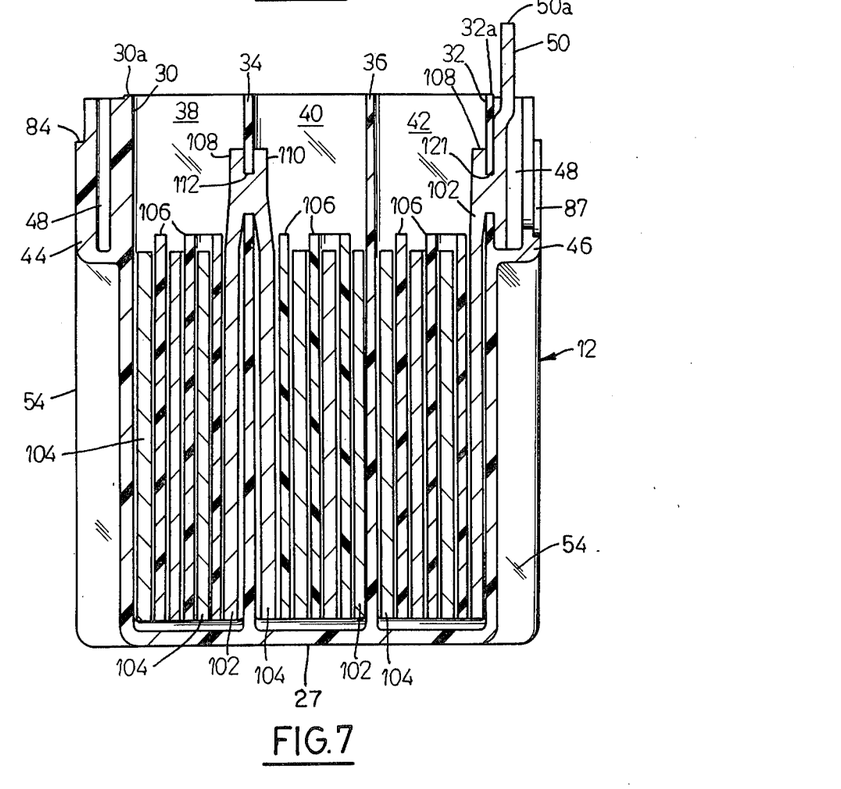
FIG. 7 is a cross-section view taken along line 7—7 in FIG. 6.

As shown in FIGS. 5–7, the cell compartments 38, 40 and 42 of the container 10 each house a pair of folded battery plates, one of the folded plates being a positive plate 102 and the other being the negative plate 104. The construction of the folded plates 102 and 104 is described in more detail in U.S. Pat. No. 4,029,855 issued June 14, 1977 to Dougherty et al, and assigned to the assignee of the present invention. The positive and negative folded plates 102 and 104 are maintained in spaced relationship by a continuous folded separator 106 comprised of micro-porous absorbent glass matting or the like. As previously described, in one preferred embodiment of the invention a liquid sulphuric acid electrolyte is used, most of the electrolyte being absorbed in the glass matting separators 106 but with some excess electrolyte not absorbed by the separator. As an alternative, a gelled electrolyte such as that described in U.S. Pat. No. 3,765,942 issued Oct. 16, 1973 to Jache could be used. In such an embodiment of the invention other types of separators, such as those comprised of a micro-porous polyethylene separator material, could be used in place of matted glass fiber separators.

The folded positive plate 102 in cell compartment 38 is shown for purposes of example an being provided with an upwardly projecting generally rectangular lug 108 positioned adjacent the partition wall 34. Similarly, the negative folded plate 104 of the adjacent cell compartment 40 includes a generally rectangular upwardly projecting lug 110 received adjacent the partition wall 34 and opposite the rectangular lug 108 of the positive plate 102. The partition wall 34 includes an aperture 112 therethrough, the aperture being between the lugs 108 and 110 of the adjacent positive and negative plates 102 and 104, respectively, such that the lugs 108 and 110 of the positive and negative plates 102 and 104, respectively, can be welded together through the partition aperture to form an electrical connection between plates 102 and 104. The method and apparatus for making such an intercell electrical connection are described in U.S. Pat. No. 3,897,269 issued July 29, 1975 to Sabatino et al and U.S. Pat. No. 3,313,658 issued Apr. 11, 1967 to Sabatino et al, both of these patents being assigned to the assignee of the present invention.

As previously stated the battery posts 50 and 52 are each positioned with their lower ends received in the channels 48, and with their upper ends 50a and 52a, respectively, projecting upwardly through notches 113 in the container cover 56 into chamber 93b for electrical connection to lead wires 114 or 116 to be described more fully hereinafter. It should be noted that though the battery posts 50 and 52 are outside the end walls 30 and 32, respectively, they are each housed within the channels 48 and the chamber 93b defined by the top cover. The battery posts 50 and 52 are each electrically connected to respective battery plates by an intercell weld extending through apertures 120 and 121 in the end walls 30 and 32, respectively. More particularly, the lower end of the positive battery post 50 is conected to the upwardly extending lug 108 of the positive folded plate 102 in cell compartment 42 by a weld connection extending through the aperture 121 in the end wall 32, and the lower end of the negative battery post 52 is connected to the upwardly extending lug 110 of the negative folded plate 104 in cell compartment 38 by a welded connection extending through aperture 120 in the end wall 30. The method for accomplishing such weld connections can be the same as those previously described for providing the intercell weld connection between the battery plates. The intercell welds through the apertures 120 and 121 forms a fluid tight seal in the apertures and a fluid tight seal with the planar surfaces of the end walls thereby preventing leakage of the electrolyte from the battery through the apertures 120 and 121.

Referring to FIG. 3, it will be noted that the notches 87 in the respective channel walls 44 and 46 of the container are located adjacent the respective battery posts 50 and 52. During the intercell welding process, electrodes are disposed on opposite sides of the plate lug 108 or 110 and the respective battery post 50 or 52 to permit an electric current to be passed through the plate lug and battery post such that they can be welded together, the notch 87 being provided to facilitate positioning of the electrode against the battery post.

Electrical Construction

Figures 8, 9, 10, 11:
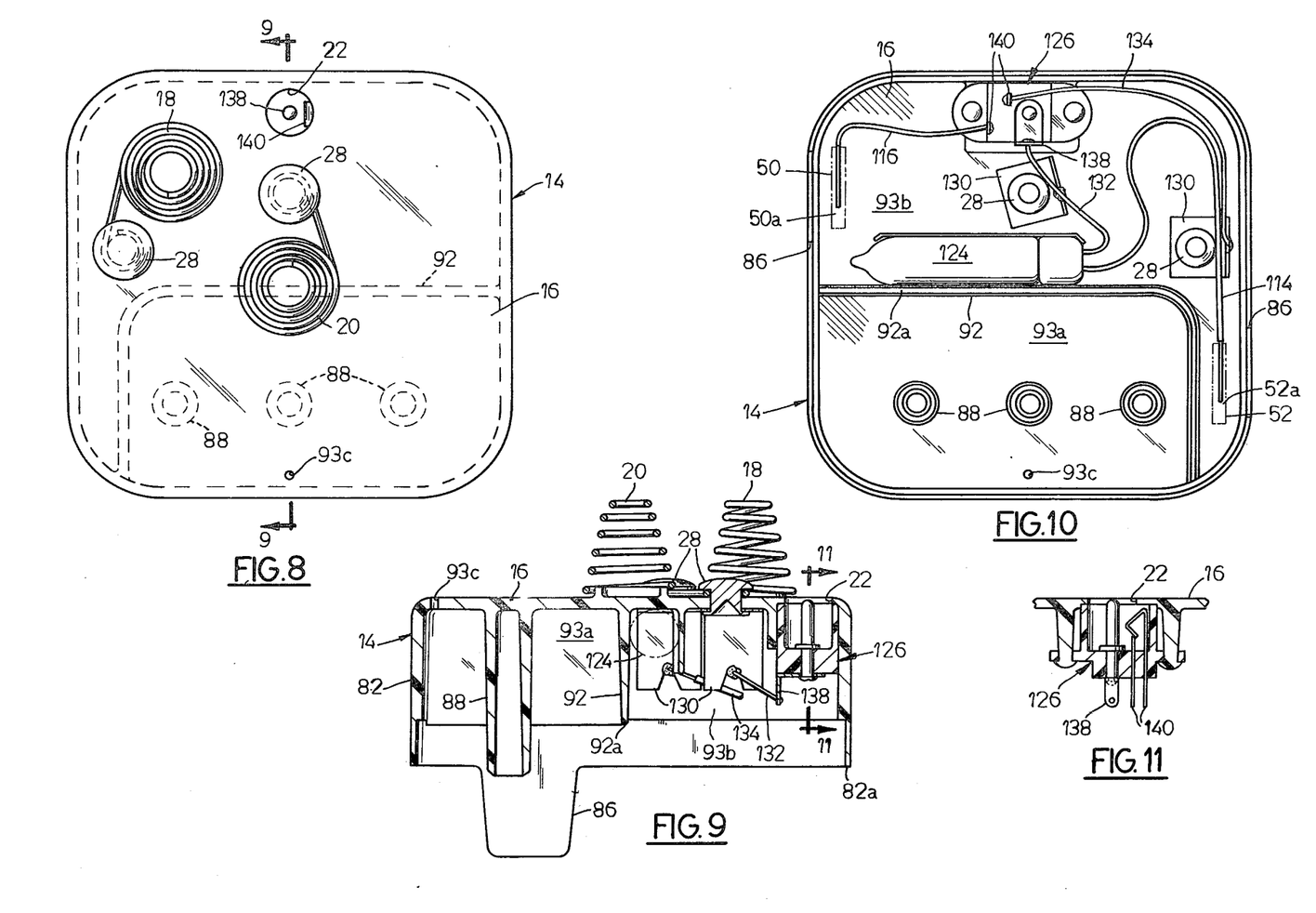
FIG. 8 is a top plan view of the top cover of the battery shown in FIG. 1.
FIG. 9 is a cross-section view taken along line 9—9 in FIG. 8.
FIG. 10 is a bottom plan view of the battery top cover shown in FIG. 8.
FIG. 11 is a cross-section view taken generally along line 11—11 in FIG. 9.
Figures 12, 13, 14, 15:
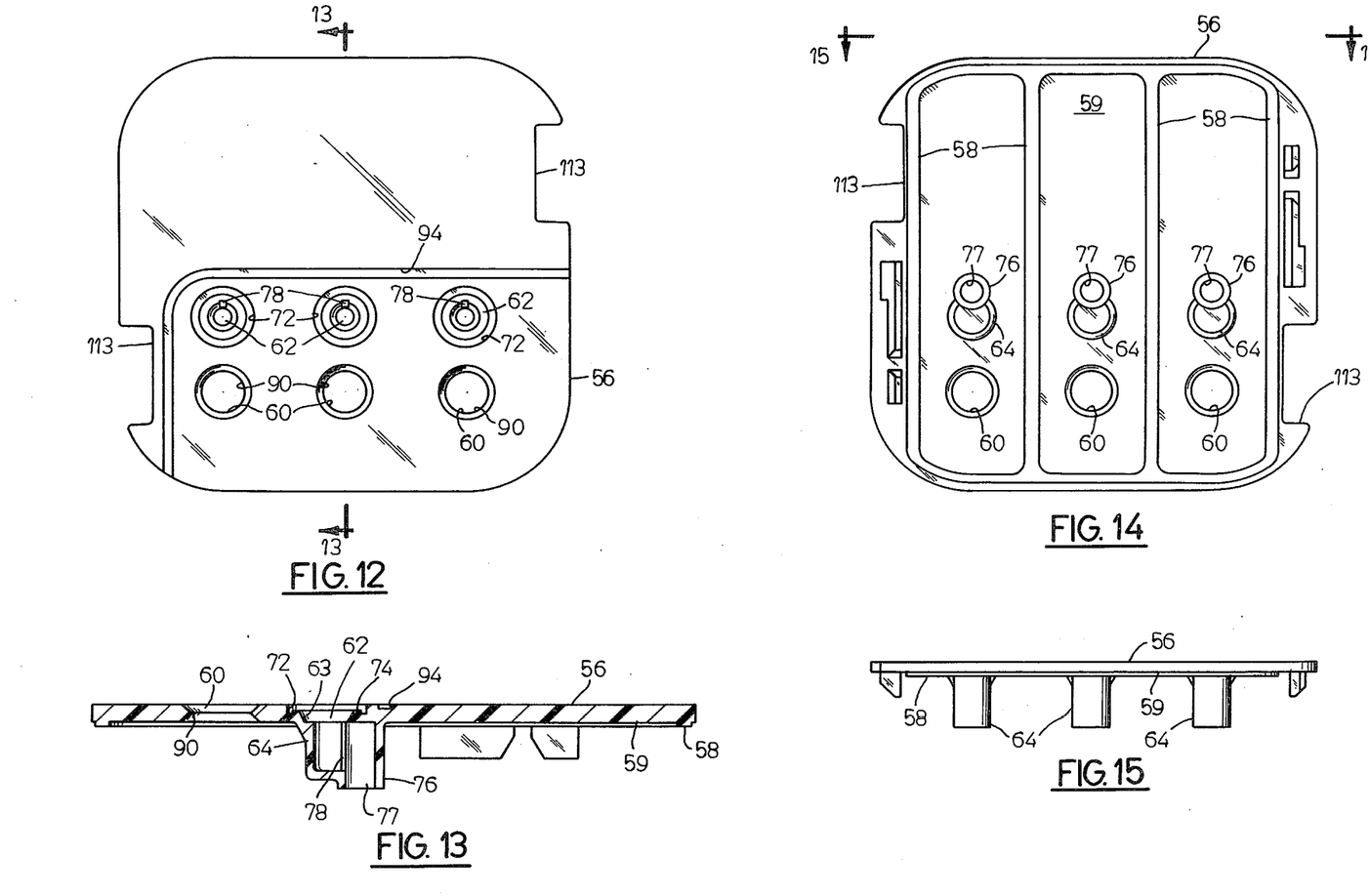
FIG. 12 is a plan view of the container cover of the battery shown in FIG. 1.
FIG. 13 is a cross-section view taken along line 13—13 in FIG. 12.
FIG. 14 is a bottom plan view of the container cover shown in FIGS. 12 and 13.
FIG. 15 is a side elevation view taken along line 15—15 in FIG. 14.
Figure 16:
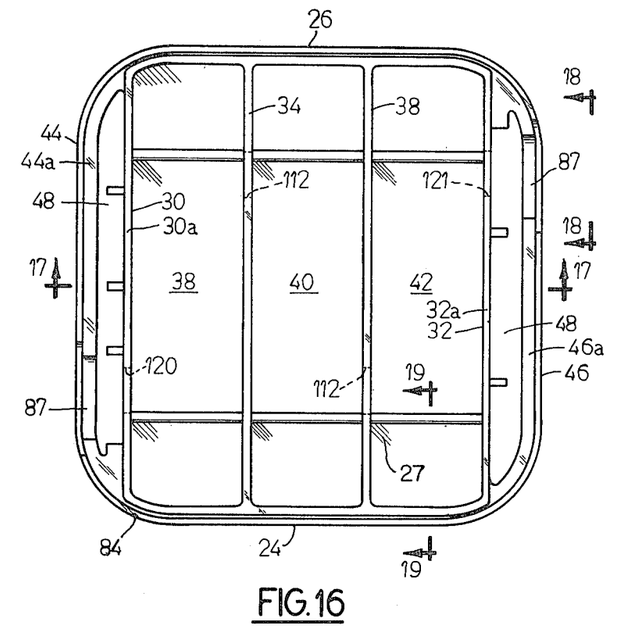
FIG. 16 is a plan view of the container of the battery shown in FIG. 1.
Figures 17, 19:
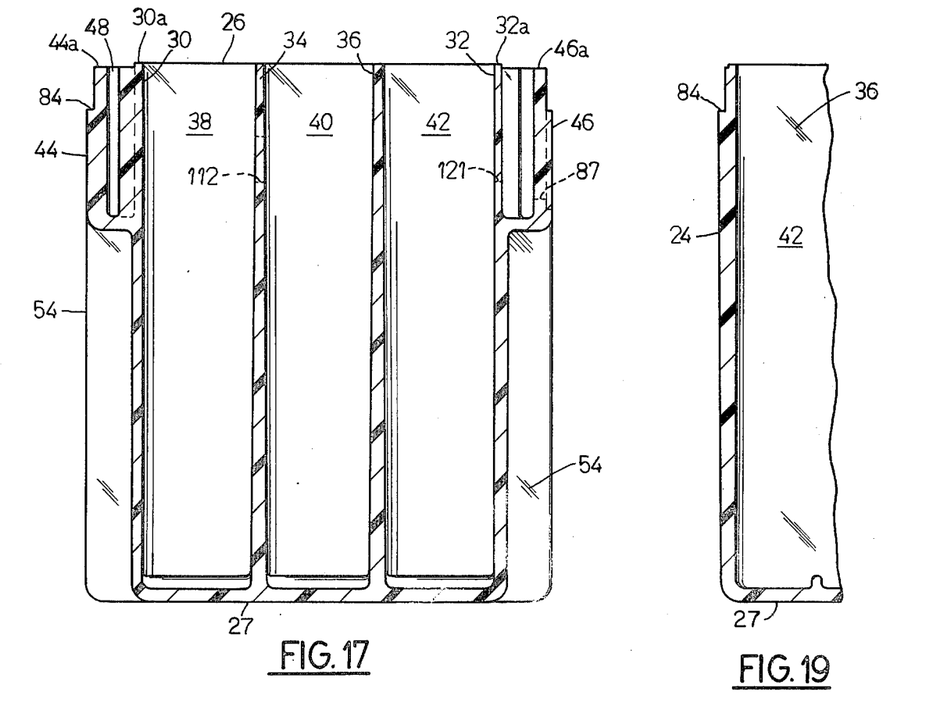
FIG. 17 is a cross-section view taken generally along line 17—17 in FIG. 16.
FIG. 19 is a partial cross-section elevation view of the container shown in FIGS. 16 and 17 and taken along line 19—19 in FIG. 16.
Figure 18:
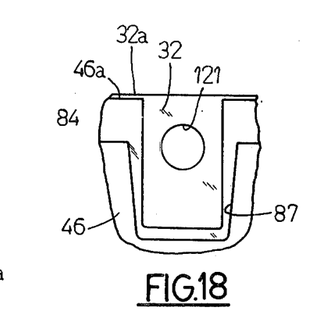
FIG. 18 is a side elevation view taken along line 18—18 in FIG. 16.

The positive and negative battery posts 50 and 52 extending upwardly through the container cover 56, are electrically connected to the spring terminals 18 and 20, respectively, and are also connected to a thermal circuit breaker 124 and a recharging jack 126 as best shown in FIG. 11.

The spring terminals 18 and 20 extend upwardly from the top wall 16 of the top cover 14 and are rigidly secured to that top surface by electrically conductive rivets 28 (FIGS. 8-10).

The lower ends of the rivets 28 engage electrically conductive angular contacts 130 and secure the contacts 130 against the lower surface of the top wall 16 of the top cover 14.

The top wall 16 of the cover also supports the thermal circuit breaker 124 and the recharging jack 126. The thermal circuit breaker 124 is intended to function as a safety device by providing for a controlled discharge of the battery in the event the battery terminals 18 and 20 or the recharging circuit are shorted. The thermal breaker 124 contains an electrically responsive resistive bimetal contact, the bimetal contact flexing and breaking the circuit if a current in excess of 8 amps is drawn from the battery. The thermal breaker is of a type commercially available from GTE-Sylvania of Stamford, Conn.

Figure 2:
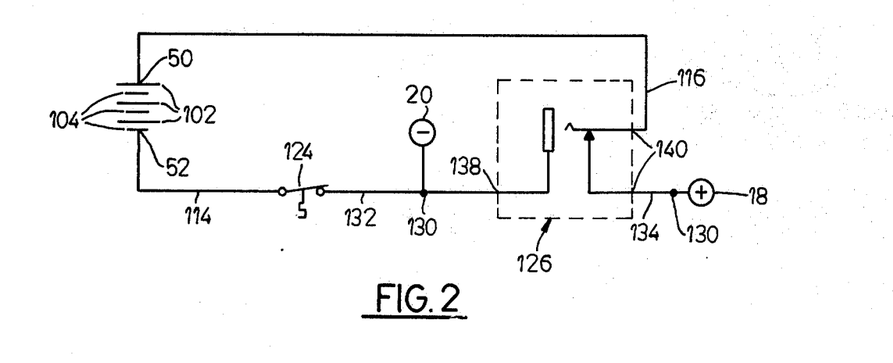
FIG. 2 is a schematic diagram of the electrical circuitry of the battery in FIG. 1.

The electrical construction of the battery is further shown in FIGS. 2 and 10. A lead wire 114 is soldered to the upwardly extending projecting end 52a of the negative battery posts 52 and is connected to the thermal circuit breaker 124. A second negative lead wire 132 extending from the thermal breaker 124 is soldered to the negative terminal 138 of the recharging jack and is also soldered intermediate its opposite ends to the electrically conductive contact 130 riveted to the negative spring terminal 20. Similarly, a positive lead wire 116 connects the upper end 50a of the battery post 50 to the positive terminal 140 of the recharging jack and a second positive lead wire 134 provides electrical connection between the positive terminal 140 of the recharging jack and the electrically conductive contact 130 riveted to the positive spring terminal 18.

RESUME

The present invention thus provides a portable battery for use in lanterns and the like, the battery being rechargeable and having a long cycle life, and the construction of the battery facilitating inexpensive manufacture such that the battery can be made available commercially at an advantageous price. More specifically, one of the advantages of the invention is that the construction of the battery facilitates use of lead-acid components rather than more expensive nickel and cadmium or the like thereby reducing the cost. Another advantage of the invention is that the battery includes a fluid tight container construction thereby premitting the use of a liquid sulphuric acid electrolyte rather than a more expensive gelled electrolyte. A further advantage of the battery, reducing its cost is that the battery posts are welded to an adjacent battery plate lug by a weld connection extending through an aperture in the container wall. This construction is both uncomplicated and prevents leakage of electrolyte. The container construction embodies a further advantage in that the top cover is secured in place by merely forcing it down against the container such that use of adhesive, heat sealing or other means of securing the top cover is unnecessary. Another advantage of the construction of the portable lead-acid battery of the invention is that the electrical components supported in the top cover can be preassembled and the top cover quickly pressed into position during the manufacturing process. An additional advantage of the construction of the battery of the invention is that the cells vent into a chamber which is separated from the chamber containing the electrical components of the battery thereby preventing undue corrosion of these electrical components.

We claim:

1. A rechargeable lead-acid portable battery comprising: a molded polymer container having a plurality of upstanding walls defining at least two cells therein separated by partition wall means; channel wall means joined to one of said upstanding container walls, said one upstanding container wall and said channel wall means defining a spatial separation therebetween, said channel wall means having a bottom edge and opposite ends connected to said upstanding container wqall and having an upper edge generally parallel to the upper edge of one of said upstanding container walls and spaced from said upper edge of said one upstanding container wall; at least a pair of battery plates supported in each of said cells, one of said plates of each of said pairs being a negative plate and the other of said plates being a positive plate; an aperture in said partition wall means; means for providing electrical connection between a positive plate of one of said cells and a negative plate of the other of said cells, said connection means including an electrically conductive connection extending through said aperture; a first cover covering said cells in sealed relation and preventing electrolyte from escaping from said cells; a second battery cover positioned over said first cover, said first and second covers defining cavity means therebetween, said second cover supporting a positive terminal and a negative terminal in spaced apart relation, and means for providing electrical connection between said plates and said positive terminal and said negative terminal.

2. The rechargeable lead-acid portable battery set forth in claim 1 wherein at least one upstanding container wall has an aperture therethrough, and wherein said means for providing electrical connection between said plates and said positive terminal and said negative terminal includes a battery post adjacent said upstanding container wall aperture and electrically connected to one of said plates by a welded connection, said welded connection extending through said aperture in said upstanding container wall and sealing said upstanding container wall aperture.

3. The rechargeable lead-acid portable battery set forth in claim 2 wherein said upstanding container wall aperture communicates between a cell and said spatial separation, and wherein said battery post has opposite ends, one of said post ends being housed in said spatial separation and electrically connected through said upstanding container wall aperture to one of said plates and the other of said post ends projecting into said cavity.

4. The rechargeable lead-acid portable battery set forth in claim 2 wherein said means for providing electrical connection further includes an electrically conductive means between said battery post and one of said terminals.

5. The rechargeable lead-acid portable battery set forth in claim 1 further includes a pair of channel wall means, each of said channel means joined to different upstanding container walls and defining separate spatial separations therebetween, said spatial separations and said cavity means being in communication, aperture means in said different upstanding container walls communicating between an adjacent cell and an adjacent spatial separation, a battery post member housed in each of said spatial separations and extending into said cavity means, an end on each of said post members connected to one of said plates in the adjacent cell by a fusion connection extending through and sealing said container wall aperture and an opposite end on each of said post members projecting into said cavity means, and the means providing electrical connection further including electrical components interconnecting said opposite ends of the post members and said terminals.

6. The rechargeable lead-acid portable battery set forth in claim 1 wherein said first cover includes means for venting gases from at least one of said cells into said cavity.

7. The rechargeable lead-acid portable battery set forth in claim 5 wherein said electrical components includes safety means for controlling current flow from the battery.

8. The rechargeable lead-acid portable battery set forth in claim 7 wherein said safety means includes a thermal circuit breaker.

9. The reachargeable lead-acid portable battery set forth in claim 5 wherein the electrical components interconnecting said post members and said terminals comprise a multi-terminal jack means having a recharge terminal extending externally of said cavity, circuit breaker means, means connecting one of said terminals and a first connection of said jack means, means connecting a second connection of said jack means to the opposite end of one of said post members, means connecting a third connection of said jack means and the other of said terminals, means connecting the circuit breaker to the other of said terminals and means connecting the circuit breaker to the opposite end of the other of said post members.

10. The rechargeable lead-acid portable battery set forth in claim 5 wherein a partition member extends between a top surface of the first cover and a bottom surface of the second cover whereby said cavity means is divided into at least two separate compartments.

11. The rechargeable lead-acid portable battery set forth in claim 10 wherein said first cover further includes means for venting gases from at least one of said cells into the first of said compartments.

12. The rechargeable lead-acid portable battery set forth in claim 10 further including in a first of said separator compartments means for fixedly securing said container and said second cover together, said means for preventing separation including a tapered mandrel secured to one of said covers and having a free end, and the other of said covers including an aperture therethrough for fixedly clampingly engaging said free end of said tapered mandrel when said tapered mandrel is forced into said aperture.

13. The rechargeable lead-acid portable battery set forth in claim 10 further includes venting means in a first of said separate compartments, and includes a second of said separate compartments having a gas tight relationship with respect to said first separate compartment for housing the means providing said electrical connections.

14. A container assembly for a lead-acid portable battery comprising a one-piece molded container portion having a plurality of cells defined therein, the container including a plurality of peripheral side walls, a bottom wall and spaced apart parallel partition walls extending transverse to two of said substantially opposite side walls and integrally joined to said two substantially opposite side walls to define cells in said container; channel wall means joined to one of said peripheral container walls and defining a space therebetween, said channel wall means having a bottom edge and opposite ends connected to said container wall, and said channel wall means having an upper edge spaced from said one of said container walls; a first cover sealing said cells; and a second cover over said first cover, said second cover including a generally planar top and downwardly extending walls from said planar top and engaged with said container portion, said second cover and said first top defining a cavity therebetween; at least one pressure relief valve supported by said first top for venting gas from said cells into said cavity; and spaced apart terminals supported by said second cover.

15. The container for a lead-acid battery as set forth in claim 14 further including means in said cavity fixedly securing said container and said second cover together, said means for preventing separation including an aperture in said first cover and a tapered mandrel having a free end and supported by said second cover, said aperture fixedly clampingly engaging said free end in locking engagement when said mandrel is forced into said aperture.

16. The container for a lead-acid battery as set forth in claim 14 wherein at least one of said side walls defining said space with said channel wall means includes an aperture communicating with said space.

17. The container for a lead-acid portable battery set forth in claim 14 wherein said first cover includes at least one bore therethrough, and wherein said relief valve comprises a resilient burp valve positioned in said bore.

* * * * *